| United States Patent [19] | [11] | 4,273,847 |
|---|---|---|
| Lennon et al. | [45] | Jun. 16, 1981 |

[54] INKS FOR PULSED ELECTRICAL PRINTING AND METHODS OF PRODUCING SAME

[75] Inventors: Donald J. J. Lennon; John R. Hagerstrom, both of Acton; C. Frederick W. Ekman, Bedford, all of Mass.

[73] Assignee: EPP Corp., Boston, Mass.

[21] Appl. No.: 102,876

[22] Filed: Dec. 12, 1979

Related U.S. Application Data

[63] Continuation of Ser. No. 710,282, Jul. 30, 1976, abandoned.

[51] Int. Cl.³ .............................................. G03G 9/08
[52] U.S. Cl. ..................................... 430/106; 430/107; 430/109; 430/110; 430/111; 430/137; 106/20; 106/23; 427/222; 428/407
[58] Field of Search ............... 430/106, 107, 109, 110, 430/111, 137; 427/222; 428/403, 407; 106/20, 30, 23

[56] References Cited

U.S. PATENT DOCUMENTS

| 2,939,804 | 6/1960 | Schossberger et al. | 430/109 X |
|---|---|---|---|
| 3,080,251 | 3/1963 | Claws | 430/120 |
| 3,166,510 | 1/1965 | West | 430/106 |
| 3,196,032 | 7/1965 | Seymour | 430/137 |
| 3,503,783 | 3/1970 | Evans | 430/31 |
| 3,550,153 | 12/1970 | Haeberle et al. | 101/426 |
| 3,607,342 | 9/1971 | Sato . | |
| 3,639,245 | 2/1972 | Pelson | 430/109 |
| 3,674,736 | 7/1972 | Lerman et al. | 430/111 |
| 3,965,022 | 6/1976 | Strong | 430/109 |
| 4,082,681 | 4/1978 | Takayama et al. | 430/106 X |

FOREIGN PATENT DOCUMENTS

50-140136  11/1975  Japan .

*Primary Examiner*—Roland E. Martin, Jr.
*Attorney, Agent, or Firm*—Kenway & Jenney

[57] ABSTRACT

A printing ink comprises particles of small size, each having a body portion consisting of a fusible resin and a colorant and electrically conductive material situated substantially entirely on the surface of the body portion. The particles may be formed by a variety of methods. The body portion may have a magnetizable constituent for use in printers with magnetic ink orientation. The particles may be formed by spray drying to produce hollow beads.

7 Claims, No Drawings

INKS FOR PULSED ELECTRICAL PRINTING AND METHODS OF PRODUCING SAME

This is a continuation of Ser. No. 710,282, filed July 30, 1976, now abandoned.

RELATED APPLICATION

This application has been assigned to the same assignee as copending applications Ser. No. 710,280, now U.S. Pat. No. 4,101,909 entitled "Magnetic Inking Apparatus for Pulsed Electrical Printing," Ser. No. 710,281, now U.S. Pat. No. 4,103,306 entitled "Non-Impact Printer With Magnetic Ink Reorientation," Ser. No. 710,283, now U.S. Pat. No. 4,156,036 entitled "Structured Donor Sheet for High-Resolution Non-Impact Printer," all filed on even date herewith, and Ser. No. 710,892, now U.S. Pat. No. 4,087,826 entitled "Pulsed Electrical Printer With Dielectrically Isolated Electrode," filed Aug. 2, 1976, and incorporates the disclosures thereof by reference as hereinafter specifically noted.

BRIEF SUMMARY OF THE INVENTION

This invention relates generally to inks suitable for use in pulsed electrical printing, as contrasted to mechanical impact and electrostatic printing. Mechanical printers deliver ink to a recipient sheet by mechanical movement from a supply or donor sheet or strip. Electrostatic printers generally employ multi-step procedures involving sequential selective charging of surfaces and transfer of toner particles by electrostatic attraction. The present invention relates more directly to printers of the general type described in the U.S. Pat. No. to Robert W. Haeberle, et al 3,550,153 dated Dec. 22, 1970. The printing process of said patent consists generally in providing an electrically conductive ink, a receiving or recipient paper or sheet, and a means for producing an electric field of a predetermined shape to be printed, in pulses between the ink and paper. In a typical application this field may be in the order of 1000 volts across a gap of between 5 and 10 mils, this gap being measured from the ink through the thickness of the receiving sheet to the pulsed field shaping electrode. The ink or pigment is in mobile, particulate form. During the brief presence of the electric field, the ink particles on pinnacles are first charged by conduction of current from other particles closer to a supporting sheet, detached by the electric field, and then caused to transfer to the receiving paper by the force induced solely by the electrical field. As described in said patent, the particles of conductive ink are initially deposited upon a surface of an ink support described as a donor sheet. In general, the amplitude and duration of the electric pulses must be so related as to cause an efficient transfer of sufficient ink for the required printing density, without causing an electrical breakdown or discharge between the electrodes.

As described in said patent, the surface of the donor sheet closest to the recipient sheet includes electrically conductive particles of a printing material dispersed in a high resistance medium. The use of a dielectric or high resistance sheet or base for the donor sheet aids in preventing undesirable electrical breakdowns. Also, the pulsed electrical field is applied to charge the printing particles selectively. The charged particles are subsequently transferred to the adjacent surface of the recipient sheet under the influence of the applied field. This is an efficient charging technique, whereby a charge is imparted to the printing particles in a very brief space of time. Because these conductive printing particles are dispersed in a high resistance medium, the electric field lines of the applied field become concentrated upon the conductive particles; thus these field lines tend to avoid the high resistance medium separating the conductive particles. The concentration of the field lines is a consequence of the concentration of induced charge upon these particles, and in addition it represents a focusing of lines of force upon the charged particles.

An object of this invention is to provide an ink that may be used for printing upon plain paper, that is, uncoated and untreated paper of economical cost. This necessity is particularly acute in high speed printers having a high volume use of paper. In any case, it is desired to provide an ink suitable for printing upon a paper that has received minimal treatment of any special kind.

A second object is to provide an ink that will produce printed copies that do not smudge when handled. This is desirable both for retention of image detail, which is particularly important in the case of pictorial matter, and for cleanliness.

Another object is to provide an ink that has an adequate image intensity.

Still other objects are to provide an ink having adequate edge definition especially when each character is printed by means of a dot matrix, adequate fill defined as ink coverage within the area defined by the characters, and minimal transfer of ink to the recipient sheet in the background areas between the characters.

A still further object is to provide an ink in black or a variety of colors that may be used with the re-inking and printing systems described in said copending applications.

An early form of ink used in the process of said patent consisted only of carbon particles. One form was a vegetable carbon finely ground in a ball mill to produce a size range from 0.25 to 25 microns. To prevent electrical breakdown, the particles were supported upon a dielectric substrate. In some cases this ink was subject to undesirable smudging, even after imbedment in the paper by the electrical transfers force. To some degree, this problem could be overcome by application of a tacky resin coating to the recipient paper, but this treatment of the paper increased its cost. An additional undesirable feature was that, although a sharp and readable image was produced by the carbon, it was considered too light for some commercial needs.

To overcome the foregoing difficulties with all-carbon inks, and to facilitate the inking of the substrate, improved forms of substrates, methods of depositing the ink particles on the substrates, and printers were developed. One such improvement is exemplified by the John Peshin U.S. Pat. No. 3,833,409, dated Sept. 3, 1974. According to this patent, the surface of the substrate facing the receiving sheet is first coated with a slurry consisting of a volatile solvent containing a binder resin and particles of silica. The solvent is evaporated, leaving a rough, microscopically craggy surface structure as a base coat. An excess of carbon particles is then coated upon the surface as a suspension in a solvent to fill the pits of the microcavernous base coat. Finally, the excess is removed by dry brushing, whereby the remaining ink is situated in irregular piles or aggregates. It was found that the formation of such aggregates facilitated the charging of the particles and enhanced the ability of a field of given strength to transfer them to the recipient sheet. It was further found that the brushing step is a necessity because the carbon particles, after being coated upon the base in the form of a suspension in a volatile liquid and after the evaporation of this liquid, are left in a mutually adhering, insufficiently mobile state. Some form of brushing is required to loosen the particles sufficiently to enable them to transfer readily under the influence of the electrical field. The necessity for dry brushing constitutes a difficulty because it is a dirty operation, it introduces a factor capable of varying the printing quality, and it necessitates additional functions in the structures of certain kinds of printers. More specifically, the method of coating the substrate with ink limits the length of the substrate, and does not lend itself to a printer structure employing the same piece of substrate material for repeated use by a method of reinking.

Various procedures have been proposed for varying the dry brushing step. One method was to add the carbon ink particles in dry form to the surface, and then to rub them into the surface with a brush or sponge. This required a delicate balance between application of sufficient force to scrub the particles into the surface and insufficient force to cause the particles to pack together.

Another method consisted in depositing particles of iron powder upon an ink carrier in the form of a continuous belt. The belt moved past a magnet having sufficient strength to retain the iron powder in the form of a dam on the belt surface. The carbon ink particles were deposited on the side of the belt approaching the dam, and the latter operated to scrub the particles into the belt. Difficulty was experienced, in that some of the iron powder was carried away by the belt and interfered with the printing operation, since the iron particles acted as more efficient field line gatherers than the carbon. The result was the production of dark and light spots in the printed matter.

In another aspect of prior development in pulsed electrical printers, shield electrodes have been provided for the character-defining electrodes, as exemplified by U.S. Pat. No. 3,733,613 to Paul L. Koch, et al, dated May 15, 1973 and U.S. Pat. No. 3,898,674 to Paul L. Koch, dated Aug. 5, 1975. The last-mentioned patent describes a dot matrix system adaptable for facsimile printing, in which each dot of the field shaping or printing electrode is surrounded by a shield electrode held at ground potential, which acts as a field focusing device. To utilize this effect efficiently and to facilitate manufacture of the electrode, a layer of dielectric material was placed between the field shaping electrode and the grounded shield electrode. It was found that the presence of this dielectric tended to reduce the necessity for imposition of a dielectric sheet between the field shaping electrode and the base electrode for prevention of electrical breakdown, as discussed above. This in turn made it unnecessary to provide an ink support consisting of dielectric material. By use of an electrically conductive ink support, it was then possible to facilitate the charging of the ink particles. The electrical pulse could be made shorter while still providing for an efficient transfer of ink to the recipient sheet. As a further development, it was found possible to use high frequency alternating current pulses in place of unidirectional electric pulses for printing. An advantage in using alternating current pulses is that since ink particles are charged with opposite polarities during alternate half-cycles, their charges tend to neutralize one another when they are deposited in electrical contact on the recipient sheet. Also, in the event of any air ionization in the presence of a high voltage pulse which might result in leaving a charge upon any dielectric surface in the printer, a subsequent pulse of opposite polarity will tend to neutralize that charge.

The development of new heat fusible particulate inks has now resulted in further improvements in the printing quality of pulsed electrical printers. Such inks comprise particles each consisting of a composite of a colorant such as a dye and a resin capable of flow or spreading when fused, together with sufficient conductive materials such as carbon on the surface to permit printing by the process of said patents. The dyes increase the covering power of printing density. By the addition of a fusing step after printing, the ink can be more firmly attached to an untreated paper, thus producing a non-smudging copy. The function of the resin is also to spread the ink by flowing when heated. The dye is used to darken the resin. A variety of resins and dyes are used, as further described below.

In the last-mentioned inks, it was found that if carbon were contained within the body of the resin-dye particles, poor flow would result during fusing. Therefore, the resin-dye particles are first prepared without the carbon. The carbon is then coated upon the outside of the particles by shaking, rolling, or other methods. The role of the carbon is mainly that of imparting conductivity to the particles, and therefore it is possible to substitute other conductive materials for the carbon. For example, metals can be coated as powders, vacuum plated on the outside of the particles, or plated thereon by electroless procedures.

The present invention comprises improvements in printing inks and in methods of manufacture, by which fusible inks may be employed in pulsed electrical printing to secure improved printing quality over previously-used inks, while minimizing or overcoming the disadvantages and limitations noted above with reference to the prior art. The inks consist of particles that may be solid or in the form of hollow beads, the particles in either case comprising a body consisting of a colorant-containing fusible resin and a surface coating of electrically conductive material on the body. One of the methods of preparing the ink body is to melt the colorant and resin together and then to grind the resultant mass after cooling. Another method is to make a solution of a dye and a resin in a volatile solvent, then spray the solution as droplets into a heated space, thereby evaporating the solvent and causing each droplet to form a hollow bead. In either of these methods the body portion of the particles may also comprise a magnetizable constituent.

Inks according to this invention produce superior printing quality particularly when employed in the printers described in said applications Ser. Nos. 710,280 and 710,281 filed on even date herewith, respectively entitled "Magnetic Inking Apparatus for Pulsed Electrical Printing" and "Non-Impact Printer With Magnetic Ink Reorientation."

DETAILED DESCRIPTION

An ink comprising particles having a fusible solid body was prepared according to the following formula.

| FORMULA 1 | | |
|---|---|---|
| Component | Percent by Weight | Source |
| Oil Black BN (Solvent Black 3 dye) | 72 | Verona Corp. |
| Arochem 455 (phenolic resin) | 18 | Ashland Chem. Co. |
| XC72R (conductive carbon) | 10 | Cabot Corp. |
| Total | 100 | |

The dye and resin in dry form were thoroughly mixed and then melted into a fused mass. This mass was ground by ball milling to form fine particles measuring about two to ten microns in size. Alternatively, it can be shaken in a can with steel shot. The carbon in finely divided form was then added to the particles and coated on them by shaking in a suitable container.

Formula 1 was also used to form ink particles having a hollow body or bead of generally spherical shape. The dye and resin were first dissolved in methylene chloride, and the solution was sprayed into a heated chamber in the presence of a large quantity of heated air. The volatile solvent was flashed off, leaving the solid in the form of small beads of generally spherical shape, and with a size range centering preferably at approximately two to ten microns in diameter. The spray comprised small droplets, each of which thus formed a bead. Each bead comprised the body portion of an ink particle in the final particulate ink product. The carbon was applied to the hollow particles in the same manner described above for the solid particles.

During the evaporation process the solvent evaporated first from the surface of each droplet, thereby forming a skin or shell of solid dye-resin material. Subsequent evaporation of the solvent took place by diffusion through this skin or shell. The result of this process was the formation of hollow beads of dye-resin with a density less than half the density of solid spheres of equal diameter comprising the same ratio of dye to resin. This resulted in a higher surface to mass ratio than for solid particles made as described above and milled to approximately the same outer dimensions. For this reason they fused more readily than solid particles. The hollow particulate product resulting from the spray drying technique had a specific gravity of the order of 0.25 gram per cubic centimeter in a typical ink thus coated, although variations from this density value have been found to print acceptably by the process described generally in said U.S. Pat. No. 3,550,153.

In inks produced as described above, the function of the carbon is primarily that of providing the conductivity necessary to permit printing according to the method of the last-mentioned patent. The function of providing the color and density for a print of the requisite darkness or contrast to the background is largely performed by the dye. After the ink has been printed upon a recipient sheet, the sheet is subjected to fusing, typically by the application of heat, although experiments have demonstrated that light of sufficient intensity may also be used for fusing. In either case, the applied energy is sufficient to fuse the ink beads or particles, causing the resin to melt and flow, spreading the dye over an area typically at least twice that which the particle will project against any plane. In general, less energy was required for the hollow particles than for the solid particles. The dye must be capable of providing a print of the requisite density over this relatively larger area.

The amount of carbon to be coated upon the ink particles is limited by the fact that an excess of carbon tends to cause the printed matter to smudge; also, too much carbon interferes with the flow of the resin during fusing, and further causes the ink beads to be packed on the ink support after coating, thereby rendering them less mobile when subjected to the printing pulses. On the other hand, too little carbon results in poor conductivity when the ink is subjected to these pulses. The amount of carbon needed for optimum print intensity is also a function of the electrode design. In general, larger print electrodes require inks having less carbon on each particle of a given size. Typically, the amount of carbon comprises 5 to 10 percent by weight of the coated ink particles.

The average size of the carbon particles is typically much smaller than that of the body of the ink particle itself. For example, an ink particle having a diameter of 2 microns ($200 \times 10^{-6}$ cm.) may be coated with carbon particles each having a diameter of the order of 0.03 micron ($3 \times 10^{-6}$ cm). The layer of carbon particles on the ink particles may have an average thickness of the order of 2 diameters of the carbon particles. Under a scanning electron microscope, the carbon layer may appear somewhat irregular in thickness. In any event the thickness is insufficient to interfere substantially with the flow of the ink particles during fusing.

Inks may also be prepared for use in printers having magnetic ink orientation and reorientation as described in said copending applications Ser. Nos. 710,280 and 710,281, respectively entitled "Magnetic Inking Apparatus for Pulsed Electrical Printing" and "Non-Impact Printer With Magnetic Ink Reorientation." An ink of this type having hollow beads was prepared according to the following formula.

| FORMULA 2 | | |
|---|---|---|
| Component | Percent by Weight | Source |
| Oil Black BN (Solvent Black 3 dye) | 34.1 | Verona Corp. |
| XPS 276 (styrene-acrylate copolymer resin) | 27.1 | Hercules Inc. |
| Piccolastic A75 (polystyrene resin) | 13.6 | Hercules Inc. |
| $Fe_3O_4$ (magnetic iron oxide) | 15.2 | Fisher Sc. Co. |
| XC72R (conductive carbon) | 10.0 | Cabot Corp. |
| Total | 100.0 | |

The dye and resins were first dissolved in methylene chloride and the magnetic material was dispersed therein. The dispersion was then spray dried to produce hollow spheres. The carbon was then applied on the surfaces of the spheres by shaking in a can with pebbles. The A75 resin exhibited excellent flow during fusion, and acted as a plasticizer for the XPS276 resin. The use of the latter imparted better smudge resistance to the print than the A75 alone. A printer using this ink produced acceptable printed matter at paper speeds of from 0 to about 50 to 65 centimeters per second.

Inks comprising solid particles with magnetizable materials were prepared according to the following formula.

FORMULA 3

| Component | Percent by Weight | Source |
|---|---|---|
| Oil Black BN (Solvent Black 3 dye) | 30.3 | Verona Corp. |
| Piccolastic A75 (polystyrene resin) | 36.1 | Hercules Inc. |
| Fe$_3$O$_4$ (magnetic iron oxide) | 26.0 | Fisher Sc. Co. |
| XC72R (conductive carbon) | 7.5 | Cabot Corp. |
| Cyanox 2246 (antioxidant) | 0.1 | Amer. Cyanamid Co. |
| Total | 100.0 | |

The above components, excluding the carbon, were intimately mixed and then melted into a fused mass. The mass was ground coarsely to approximately a 60 mesh, and this material was then jet milled using a laboratory micronizer. Finally, the carbon was added to the particles by shaking. It was noted that in this formula, containing a substantially higher level of magnetic material than formula 2, the A75 resin also provided excellent flow during fusing.

Formula 3 also contained an antioxidant which functioned to prevent fading and discoloring of the ink when exposed to light.

The use of a relatively greater quantity of magnetic material as in formula 3 generally permits the operation of a printer at greater paper speeds. For example, in the printer described in said application Ser. No. 710,280 entitled "Magnetic Inking Apparatus for Pulsed Electrical Printing," the ink is deposited upon the surface of an ink carrier in the form of a moving belt or drum with a roughened surface. The roughened surface may be imparted to the base material of the ink carrier itself, or to a coating applied on the base material. The surface then passes adjacent a magnet that prevents the further forward motion of the largest portion of the deposited ink, which then forms a roll or bead over the magnet. As this bead turns, some of the ink is removed and carried forward by the roughened surface. The ink carrier with this removed portion of the ink then passes, together with a receiving sheet of paper between a set of electrodes used for printing according to the process described generally in said U.S. Pat. No. 3,550,153. In order for the ink retained by the magnet to roll, as contrasted to skidding or simply passing over the magnet, the ink must possess enough magnetically susceptible material of the correct type, without an excessive quantity thereof. The quantity used is interrelated with the field strength of the magnet. Further, as described in said application Ser. No. 710,281 entitled "Non-Impact Printer With Magnetic Ink Reorientation," it may be necessary to provide sufficient magnetic characteristics in the ink to permit its use in conjunction with a magnet or magnets located at the printing station where such magnets are employed. Factors to be taken into account include the substrate roughness, the rate of change of the magnetic field strength at the exit side of the bead of ink retained at the reinking station, and the primarily downward and horizontal vectors of magnetic and gravitational forces at the top of this bead. The surface roughness of the substrate draws ink forward at the bottom of the bead, the sharp decline in field strength at the exit side of the bead causes most of the particles to pile up at this point, and the horizontal and downward forces at the top of the bead cause the piled-up ink at the exit side of the bead to feed back toward the entrance point. It will be apparent that where a substantial amount of magnetically susceptible material is incorporated in the ink particles, the presence of magnetic material in the ink support itself as described in said applications will improve the adherence of the ink particles to the support, which may then move at faster lineal speeds.

Since the handling of the ink particles during the above-described reinking operation may be fairly rough, it is important that the magnetic material in the ink be retained rather than drawn from the particles and held on the magnet. This necessity is provided for by putting the magnetic material inside the dye-resin particles as described above, rather than depositing it on the outside with the carbon particles. The dye and resin thus comprise a matrix for the magnetic particles, but neither this matrix nor the carbon materially affects the magnetic forces exerted upon the ink particles or beads by the magnetic field.

As mentioned in said U.S. Pat. No. 3,550,153, conductive pigments other than carbon may be used, for example powdered metals, e.g., brass, and metal oxides, e.g., lead dioxide. An ink having solid particles may be prepared, for example, by the following formula.

FORMULA 4

| Component | Percent by Weight | Source |
|---|---|---|
| Fat Red BB (red dye) | 21.1 | American Hoechst |
| Arochem 455 (phenolic resin, rosin modified) | 47.4 | Ashland Chem. Co. |
| Fe$_3$O$_4$ (magnetic iron oxide) | 5.2 | Fisher Sc. Co. |
| Bronze powder (flake) | 26.3 | |
| Total | 100.0 | |

The above components, except the bronze powder, were thoroughly mixed and melted into a fused mass. This mass was ground by ball milling, following which the bronze powder was coated on the particles by shaking. This ink printed red.

An ink that printed blue was prepared by a formula similar to formula 4, except that the bronze powder was replaced with an equal weight of aluminum powder and Spirit Blue H2 from American Hoechst was substituted for the Fat Red BB. It will be apparent that other colors may also be produced in inks of the foregoing type.

As indicated by the foregoing example, dyes in a variety of colors may be used in the practice of this invention. The dyes selected are preferably those that exhibit adequate stability against fading or sublimation in use, and that are generally compatible with or aid in the flow of the resin during fusion following printing. In addition to dyes, other colorants may be used, for example pigments such as carbon or cadmium sulfide. As used herein, the term "colorants" is intended to include dyes and pigments.

In the foregoing examples, the conductive carbon or other conductive particles are retained on the surfaces of the ink particles by van der Waals forces, but in some cases it is desirable to supplement these forces by one of a number of techniques. One such technique may be characterized as heat attachment. According to this technique, the dye-resin particles are heated to a point where the surface becomes slightly tacky, thereby permitting the carbon or other conductive particles to set into the surface. The ink is then cooled to ambient temperature. The heat must be sufficient to cause the surface of the particles to become tacky, but insufficient to cause adjacent particles to cohere or to cause the particles to melt or to lose their structural integrity. Using ink particles formed according to any of the above examples, one method is to add the particles and carbon to a pebble mill which has been heated to between 50 degrees and 100 degrees C. The mixture is rolled together either with or without grinding media for between 2 minutes and several hours. Another method is to shake the ink particles and carbon together at ambient temperature, and to heat the mixture subsequently in batches in an oven heated to approximately the same temperature range.

Another technique for improving the adhesion of conductive material to the ink particles is illustrated by the following formula.

FORMULA 5

| Component | Percent by Weight | Source |
|---|---|---|
| Oil Black BN (Solvent Black 3 dye) | 60.0 | Verona Corp. |
| Arochem 455 (phenolic resin, rosin modified) | 18.3 | Ashland Chem. Co. |
| $Fe_3O_4$ (magnetic iron oxide) | 10.0 | Fisher Sc. Co. |
| XC72R (conductive carbon) | 10.0 | Cabot Corp. |
| polyvinyl stearate | 0.2 | Polymer Sciences |
| Aerosil 200 (fumed silica) | 1.5 | DeGussa, Inc. |
| Total | 100.0 | |

Hollow beads were prepared by first dissolving the dye and resin in methylene chloride, dispersing the magnetic material in the solution, and spray drying as described above to produce beads of hollow form. The polyvinyl stearate was separately dissolved in heptane, the latter being selected because of the nonsolubility of the resin and dye beads therein. Freon TF may be substituted for heptane, if desired. The dye-resin beads and the carbon were then slurried in the polyvinyl stearate solution, and this slurry was then spray dried to cause the ink beads to be coated with a conductive layer comprising the carbon and polyvinyl stearate. The latter resin acts as an aid in holding the carbon on the ink particle surface. After the foregoing steps, the Aerosil is added by mixing, and serves to aid in the dry flow of the bulk coated ink particles.

Another technique of causing the carbon to adhere to the dye-resin ink particles consisted in first preparing the dye-resin particles as described above in connection with formula 5. Gelva 263 multipolymer solution, a polyvinyl acetate sold by Monsanto, was separately mixed with and coated onto a high surface area material such as Aerosil 200, and this mixture was then added to and mixed with the dye-resin particles and carbon. The Gelva and Aerosil were typically mixed together in weight ratios ranging from equal parts of Aerosil and Gelva to two parts of Aerosil to one part of Gelva. About 0.25 to 1.00 gram of this mixture was added per 20 grams of the dye-resin and carbon mixture. This process was performed in a dry state, as contrasted with the process described with reference to formula 5.

While the magnetically susceptible material is preferably distributed throughout the body portion of the ink beads as described in the above examples, the carbon is preferably deposited on the outside surfaces thereof in order to maintain electrical continuity. It is not necessary that each carbon particle physically touch another, although adjacent particles should be within at least 100 angstrom units of one another for electrical conduction to occur. Actual touching between the carbon particles improves conductivity, but with the high voltage fields usually employed an ink may be acceptable even with a high resistivity. In general, the volume resistivity of the coated ink beads is preferably low when measured at low voltages of the order of one to two volts per cm., for example 10 to $10^3$ ohm cm.

Inks prepared according to the processes of this invention produce uniformly pigmented blocks or areas of dark print when transferred by an electric field as described in said U.S. Pat. No. 3,550,153. In the presence of such a field, as contrasted to an electrostatic field, the amount of ink that is transferred is a function of the applied voltage. This permits "shade of grey" printing. The total quantity of ink transferred to any surface is limited only by the voltage that is applied. The limiting value is that which produce a gas discharge or breakdown. However, the ink coverage on the recipient sheet is enhanced as a result of the fusion and spreading of the resin, which correspondingly spreads the dye during the fusing step. These satisfactory results have been obtained using untreated paper as the recipient sheet.

For a printed image to have satisfactory edge definition, where the printing ink comprises discrete particles as hereinabove described, these particles must be individually too small to be resolved visually, or they must be caused to flow together and to lose their individuality in the final printed product. The desired resolution sets a variable limit on the particle size. For example, if the desired resolution is one mil and the smallest particle were 4 mils in diameter, then the desired resolution could not be obtained. On the other hand, if the largest particle is 4 mils in diameter and the range of diameters of the particles is between 4 mils and 0.4 mil, then if the distribution curve shows the largest population of particles to have a diameter in the range between 0.5 and 0.6 mil, the desired resolution can be obtained in some, but not all, instances. In general, it is desirable for the largest ink particle to have a diameter that is approximately half the measurement that defines the desired visual resolution. On the other hand, the ink particles according to this invention should not be so small as to tend to pack together after coating upon the ink carrier. In general, larger ink particles tend to agglomerate less than smaller particles. On the other hand, if the flow during fusing is too great, "feathering" may result, causing poor definition of the printed characters.

It has been found that during fusion, the hollow beads of this invention melt and flow more readily than do the solid particles of a similar diameter. In addition, they possess a large surface-to-mass ratio and thus transfer to the recipient sheet more easily than solid particles. The process of fusion has the dual effect of attaching the ink particles to the recipient paper and causing them to spread thereon as described above. During fusing, inks prepared according to this invention ordinarily fuse sufficiently to penetrate the paper substrate. Thus there is no ink pile on the paper surface which would cause a tendency to smudge when subjected to abrasion. For this reason suitable inks may be prepared without the use of abrasion-resistant resins which are ordinarily those having a higher molecular weight and higher fusion temperatures. On the other hand, tougher and higher molecular weight resins can be used in systems according to this invention to resist smudging where the recipient sheet is non-porous, provided that sufficient flow is produced during the fusing step to obtain the desired printing density and fill.

The resins that can be used to form inks suitable for printing as described above are not narrowly restricted as to chemical type or as to molecular weight. To demonstrate this, a series of inks were prepared using polystyrene resins that covered a molecular weight range from less than 500 to about 100,000. All inks contained about 45 percent resin or resins, the remainder being dye, iron oxide and carbon. The lowest molecular weight resin used was Piccolastic A50 sold by Hercules, Inc. This has a molecular weight of less than 500. The highest molecular weight resin used was Dylene KTPL5 sold by Arco, which had a molecular weight range centering at about 100,000. It was found that as the moleculars weight increases within this series, the flow during fusion generally decreases. At the lowest molecular weight in the series, the resin had excellent flow during fusion, but there was a tendency for the resin to become tacky which resulted in difficulty in handling the bulk ink. At the highest molecular weights the ink exhibited good handling in bulk form but flow during fusion tended to be somewhat inadequate for proper intensity development. However, the resins cited above at both ends of the series were nevertheless used successfully in combination with other polystyrene resins and with each other. The Piccolastic A50 was used in combination with several different resins of higher molecular weight to produce inks with adequate intensity in "shade of grey" printing. For example, one part of A50 was used with two parts of "LOME" resin sold by Foster Grant, having a molecular weight of 3000. In another ink one part of A50 was used with one part of Piccolastic E100 sold by Hercules, Inc., having a molecular weight of 4000 to 6000. In still another ink, one part of the Dylene KTPL5 was used with one and one-half parts of Piccolastic A50.

In general, in formulating inks for use in the above-described printing process, attention must be given to the resin system to ensure proper handling of the bulk powder as well as proper spreading during fusion of the printed particles.

The range of useful resins is illustrated, although by no means limited, by the following formulas.

FORMULA 6

| Component | Percent by Weight | Source |
|---|---|---|
| Oil Black BN (Solvent Black 3 dye) | 37.00 | Verona Corp. |
| Piccolastic A75 (polystyrene resin) | 22.25 | Hercules, Inc. |
| Picco 6070 (aliphatic hydrocarbon resin) | 22.25 | Hercules, Inc. |
| $Fe_3O_4$ (magnetic iron oxide) | 10.00 | Fisher Sc. Co. |
| XC72R (conductive carbon) | 7.50 | Cabot Corp. |
| Aerosil 200 (fumed silica) | 1.00 | DeGussa, Inc. |
| Total | 100.00 | |

FORMULA 7

| Component | Percent by Weight | Source |
|---|---|---|
| Oil Black (Solvent Black 3 dye) | 45.0 | Verona Corp. |
| Elvacite 2045 (polyisobutyl methacrylate) | 33.5 | E. I. du Pont |
| $Fe_3O_4$ (magnetic iron oxide) | 10.0 | Fisher Sc. Co. |
| XC72R (conductive carbon) | 10.0 | Cabot Corp. |
| Aerosil 200 (fumed silica) | 1.5 | DeGussa, Inc. |
| Total | 100.0 | |

FORMULA 8

| Component | Percent by Weight | Source |
|---|---|---|
| 3 parts PBW Base DS-3032 (Nigrosine basic powder dye) 5 parts PBW stearic acid-enhancing intensity coloring powder | 69.0 | Dye Specialties, Inc. |
| Arofene 612 (phenolic resin, not rosin modified) | 13.8 | Ashland Chem. Co. |
| $Fe_3O_4$ (magnetic iron oxide) | 9.2 | Fisher Sc. Co. |
| XC72R (conductive carbon) | 6.5 | Cabot Corp. |
| Aerosil 200 (fumed silica) | 1.5 | DeGussa, Inc. |
| Total | 100.0 | |

Formulas 6 and 7 were used to produce hollow ink particles and formula 8 was used to produce solid particles by the methods previously described. All produced inks of good intensity.

In the above formulas including magnetic iron oxide, the inks were successfully coated upon an ink carrier adapted for reinking, as described in said application Ser. No. 710,280 entitled "Magnetic Inking Apparatus for Pulsed Electrical Printing." The use of the magnetically susceptible ink obviates the necessity for mechanical brushing of dry powders on to a belt or similar surface. In addition, the magnetic inking technique described in the last-mentioned applicationd is more gentle to the ink particle than mechanical scrubbing methods. Thus resins having lower melting points may be employed without producing packing of the ink on the ink carrier with attendant loss of mobility.

Inks prepared according to the above formula were also found to produce not only adequate print density, but also good definition and fill without spotting, that is, without objectionable spots of high visual print density caused by localized high concentrations of ink particles within the outlines of printed characters.

We claim:
1. A printing ink comprising particles each having
    a body of fusible resin with a colorant dispersed therein, said body being about two to ten microns in size, and
    an electrically conductive coating overlying the surface of said body and consisting of electrically conductive carbon particles adhering thereto substantially by van der Waals forces, said particles being in sufficiently close mutual proximity for continuous electrical conduction therebetween within said coating and forming a layer of average thickness substantially exceeding the diameters of the particles, said printing ink having a volume resistivity of from 10 to $10^3$ ohm cm. measured at between one and two volts per cm., said coating comprising between 5 and 10 percent by weight of said printing ink.
2. A printing ink according to claim 1, in which said body has a magnetizable material dispersed therein.

3. A printing ink according to claim 2, in which the magnetizable material comprises particulate $Fe_3O_4$.

4. A printing ink according to claim 2, in which the magnetizable material comprises between seven and forty percent by weight of the particles.

5. A printing ink according to claim 1, in which the body is a hollow bead.

6. A printing ink according to claim 1, in which the body is adapted to fuse and spread over at least twice its projected area and to spread the colorant therewith upon the application of heat.

7. A printing ink according to claim 1, in which the layer of carbon particles has an average thickness of the order of two diameters of the carbon particles.

* * * * *